United States Patent [19]

Cronshaw et al.

[11] 4,080,651
[45] Mar. 21, 1978

[54] MEMORY CONTROL PROCESSOR

[75] Inventors: David Cronshaw, Torrance; William D. Turner, San Marino; Jack E. Shemer, Los Angeles, all of Calif.

[73] Assignee: Xerox Corporation, Stamford, Conn.

[21] Appl. No.: 769,611

[22] Filed: Feb. 17, 1977

[51] Int. Cl.² .................. G06F 13/08; G06F 9/10
[52] U.S. Cl. .................................................. 364/200
[58] Field of Search .............................. 364/200, 900

[56] References Cited

U.S. PATENT DOCUMENTS

| | | | |
|---|---|---|---|
| 3,593,315 | 7/1971 | Patel | 364/200 |
| 3,652,804 | 3/1972 | Comella | 364/200 |
| 3,675,217 | 7/1972 | Dauber et al. | 364/200 |
| 3,676,846 | 7/1972 | Busch | 364/200 |
| 3,693,165 | 9/1972 | Reiley et al. | 364/200 |
| 3,729,712 | 4/1973 | Glassman | 364/900 |
| 3,768,075 | 10/1973 | Reitsma et al. | 364/200 |
| 3,824,561 | 7/1974 | Wolf | 364/200 |
| 3,878,513 | 4/1975 | Werner | 364/200 |
| 3,882,470 | 5/1975 | Hunter | 364/900 |
| 3,900,834 | 8/1975 | Casey et al. | 364/200 |
| 3,965,335 | 6/1976 | Ricei et al. | 364/200 |
| 3,972,026 | 7/1976 | Waitman et al. | 364/900 |
| 3,988,719 | 10/1976 | Whitby et al. | 364/200 |

Primary Examiner—Gareth D. Shaw
Assistant Examiner—Jan E. Rhoads
Attorney, Agent, or Firm—L. Zalman; S. F. Raizes; J. J. Ralabate

[57] ABSTRACT

A memory control processor adapted to expand a random access or accelerator memory by logical overlays which performs these overlays into memory fields (pages) on the basis of page usage history. To provide a quick reference to page use a chronological sequence is established by links rather than by reordering a stack. This link sequence is tied by very limited leads to the rest of the memory control processor and can therefore be updated during each memory access. In addition the memory control processor includes a task priority logic integrating various competing memory access requests with the overlay operations. To achieve the various transfer modes in the quickest time the memory control processor is organized around a wide control memory storing the task servicing sequences. The width of the control memory and the associated task logic allow general purpose microprogrammable direct memory access which may further be utilized in multiplexed fashion to accommodate various concurrent tasks.

9 Claims, 10 Drawing Figures

MEMORY CONTROL PROCESSOR

BACKGROUND OF THE INVENTION

1. Field of the Invention

The present invention relates to memory systems, in more particularly to a multilevel memory system where information stored in the lower level is advanced to the upper level according to a logical algorithm.

2. Description of the Prior Art

With the recent decreases in costs of microprocessor systems, many applications previously done by hand or in logic circuits are now being transferred thereto. Because of limited addressing capability and input-output structure in such microprocessors, any program task which requires a large memory transfer typically entails the use of a buffer memory or accelerator memory. Such accelerator memory is normally conformed as a random access store having switching times within the switching domain of the central processor. Thus, a processor which requires memory service will first look to the buffer store in order to conserve the waiting time. Random access memory having essentially the same switching speed as the central processor is, however, still expensive and therefore only limited use thereof is possible. Storage of bulk data is still most economically performed by serial storage devices such as a serial or disc magnetic store or charge-coupled-device (CCD) semiconductor store. Thus, with more complex applications, it is this serial store that contains most of the data and instructions. Such is often referred to as the system main store. Typically, in the prior art, the transfer from such main store to the random access store was performed by either invoking some overlay routine or by periodic update. In microprocessor applications, which are characteristically quite limited in their control complexity, overlay subroutines entail a large programming task for the user. Similarly, all control techniques for swapping data between the main store and the accelerator store typically complicate the system. Thus, the programmer must necessarily be either familiar with the memory structure used in these prior art techniques or must learn the architecture of a complicated control system.

With the decrease in cost of microprocessors, there has been a recent attendant wider or more popular dissemination of these devices and personnel having the necessary learning and skill to manipulate large memory systems are less frequently available. Thus, any user technique which entails complicated memory service manipulation becomes an increasingly larger source of system errors and the decreased cost of the processing equipment is traded off, without benefit, for an increased cost of programming man hours.

SUMMARY OF THE INVENTION

Accordingly, it is the general purpose and object of the present invention to provide a multilevel memory system which includes an autonomous control processor by which memory overlays from main store into accelerator memory are controlled without intervention from the main central processor of the system.

Other objects of the invention are to provide an autonomous memory overlay system in which transfers from a bulk store are made to the least recently used fields of the accelerator store.

Further objects of the invention are to provide a memory accelerator system wherein the address sequence corresponds to the address locations of the main or bulk store.

Yet further objects are to provide a hardware implementation for monitoring memory usage and referencing whereby the unloading of an accelerator store is logically controlled.

Other objects of the invention are to provide a microprogrammable task system in which a plurality of tasks may be currently active, thus allowing for multiplexed direct memory access.

These and other objects are accomplished within the present invention by providing an autonomous memory control processor comprising a random access memory (RAM) accelerator store, of limited capacity, through which the main store is brought up. The accelerator store has a capacity to contain several "pages" of information, each page corresponding one sector field in the serial main store, shown herein as a disc. To maintain a coherent set of nomenclature throughout this disclosure, the accelerator store will therefore be referred to as the page buffer store. Associated with the page buffer store is a map memory.

The address structure of this system is tied to the address sequence of the main store, i.e., the disc, and the map memory provides the necessary transposition into the page buffer store should the addressed fields be stored therein. In the absence of the requested data in the page buffer store the memory request is acknowledged but rejected and the requesting device goes into a hold or repeat mode. The memory control processor then takes over and by its own logic updates the page buffer store with the necessary pages of data. This transfer is made according to a logical decision, where the requested page is transferred to the page buffer store at a least recently used buffer location or at a location selected by any other logical algorithm based on page usage history. Once that transfer is completed a common signal is issued to all of the peripheral devices to try again.

Concurrently, the map memory records a pointer to the page buffer memory field now loaded with this data. Thus, any address request when presented to the map memory will be decoded both as to the presence of that data in the page buffer store and the location thereof. In addition, the map memory may include any linking pointers whereby a particular page sequence can be invoked and a tag bit which indicates whether a particular page for this overlay is to be fixed in the page buffer store during the selected operations.

The least recently used overlay mechanism is conformed as a link table wherein links establishing a particular order of the page buffer store fields or pages is maintained. This order is set according to a strict hierarchy where the most recently used page is at the bottom of the stack and the least recently used pages at the top of the stack. In this manner, the pages and the page buffer store are rank-ordered according to their recent use history and those pages which have been used least recently are available for swapping or overlay.

The foregoing summary of the least recently used page swapping technique entails the use of a separate microprocessor segment dedicated to this memory service. To facilitate description, this segment is shown in conjunction with a broad memory control tied to a tasking system described in application Ser. No. 769,594, filed Feb. 17, 1977, and entitled "Soft Display Word Processing System". Selected parts of the foregoing concurrent application are included herewith as Appendix A, and reference should be had to this appendix for the details of operation thereof.

As is shown in this appendix, the general system includes at least one other processor (referred herein as the text processor) illustrated in the environment of a word processing system, by which programmed operations are performed. The memory control processor, described herein, provides the function of memory expansion for such main processors. Thus, the programmer addresses memory, for example, in a fairly straightforward manner, memory address references being made to addresses in the serial main store (disc). This arrangement simplifies the programming technique to a single memory address sequence where all of the memory acceleration functions are automatically performed by the memory control processor and are thus essentially invisible to the other processors.

In a copending application, Ser. No. 518,679 entitled "Task Handling in a Microprogrammable Device", now abandoned besides this overlay function, one additional function that is performed by the memory control processor is the housekeeping function of sorting and ranking various conflicting memory control processor service requests made by the system components. This is provided for in a priority logic stage which, by hard wired connections and program break points, resolves any conflicts between requests. The presently discussed memory access is therefore a request of a certain priority. Thus, a read memory request once achieving a highest priority, is handled through a servicing microsequence which may include a branch node conditioned by the status of the data, i.e., whether it is in the page buffer store or in the main memory, and if that branch indicates that main memory transfer is to occur, a transfer execution cycle is invoked. Similarly, the write memory request invokes a servicing microsequence which again includes branch points depending on the state of the page buffer store. As far as any other processor is concerned, however, those microsequences are not visible. Since some of the higher priority tasks may entail long servicing sequences each sequence includes breakpoints, which through an improvement over the referenced application disclosed herein periodically defer to lower priority tasks. In this manner, several tasks of unequal priority may be executed in a multiplexed fashion. This feature uniquely accommodates various timing and volatility requirements of the associated devices. During overlay the using processor simply includes repeater or hold logic which will be invoked to repeat or hold the read or the write request until answered by the memory control processor.

By way of the above illustration, a system which essentially decouples the memory functions from the programming task is shown. This system, arranged in the memory control processor, includes a requisite scratch pad memory which is concurrently utilized by the task sequences including the reference features described. Thus, for example, in the memory read request servicing sequence, if the required page is not present in the page buffer store, the requested address is written into the scratch pad to be used in the page replacement routine.

In this form, the whole memory space appears to the user as a large random access memory which by its autonomous sequences promotes and demotes pages from a serial store in a logical sequence depending on the recent use history.

DESCRIPTION OF THE SPECIFIC EMBODIMENT

While the following description of the present invention is illustrated in the context of a word processing system, such is exemplary only. It is to be noted that problems of memory expansion appear in almost all data processing applications and no intent to limit the scope of the invention by the use selected is expressed.

As a further caveat, the architectural separation of the memory control processor described herein is also exemplary. It is to be noted that physical separations other than the ones shown may be apparent to those skilled in the art and other interface arrangement schemes are therefore contemplated within the scope of the present invention.

In addition, any other arrangement of memory hierarchy can be accommodated herein, including, but not limited to, non-homogeneous main memory systems comprising various technologies.

Exemplary Using System

Figure 1:
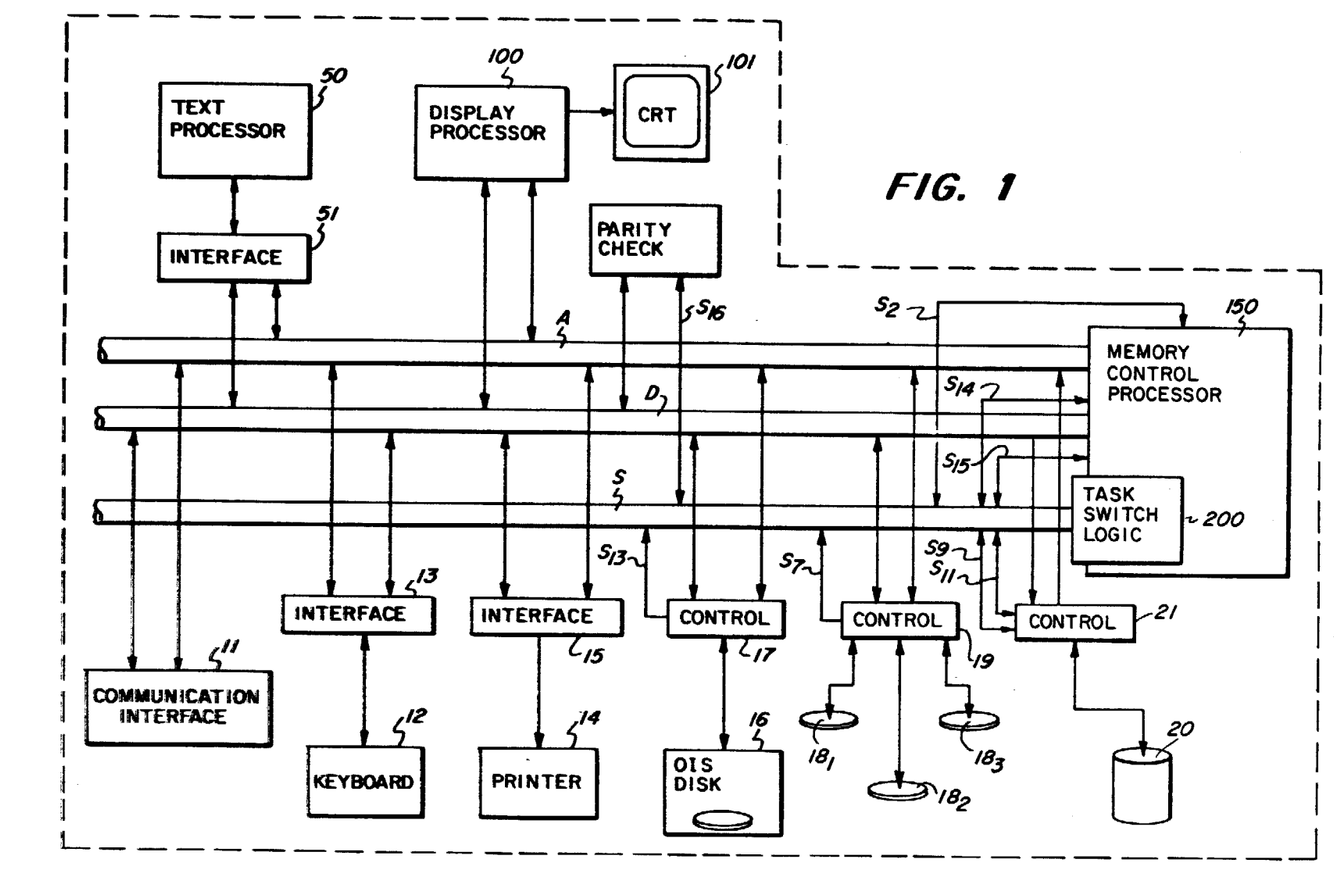
FIG. 1 is a block diagram of a data processing system adapted for use with a memory control processor constructed according to the present invention.

In order to summarize one environment for the memory control processor, a word processing system 10 as shown in FIG. 1 is set forth. It is to be noted that the implementation details of such an exemplary system has been carried out in the referenced, concurrently filed application and the present summary is, therefore, repeated at this point to complete the environment. One should refer to the attached Appendix A where selected parts of the foregoing applications are included, illustrating in detail one implementation of a system incorporating the memory control processor. Thus, FIG. 1 comprises a word processing system generally designated by the numeral 10 incorporating an external bus system including an address bus A, data bus D and a system bus S. Buses A and D are conventional in their structure, including the necessary clock signals to organize system operations. Bus S, on the other hand, is a loosely organized set of signal leads connected to integrate the distributed functions of the present system and is identified as a bus for purposes of nomenclature only.

Connected to the A and D buses are the various processing elements of the system. More specifically, a processor identified herein as a text processor 50 is tied across an interface stage 51 to buses A and D. Text processor 50 may be any conventional processor modified to operate in a wait or repeating mode for memory access. For the purposes herein a microprocessor IMP 16C, made by National Semiconductor, can be utilized in conjunction with repeating logic provided in an interface 51. It is the function of this text processor 50 to execute the program instructions imposed on the system.

Connected to buses A and D is a memory control processor 150 which, by means described in the present application, provides for autonomous virtual memory expansion.

Buses A and D are also tied to various peripheral and input and output devices. Specifically, tied both to buses A and D is a communication interface 11 through which the present processing system can communicate with various other systems. Also connected to buses A and D is a keyboard 12 with its associated interface 13, a high speed printer 14, with its interface and control 15, an auxiliary magnetic storage system 16 with its associated control stage 17, a plurality of replaceable or floppy disc files $18_1$ - $18_3$ with their associated control 19 and a main memory disc 20 with its associated control 21.

This arrangement of parts illustrates one particular data processing system in which more than one processor is combined through an external bus system to perform the functions set forth in the application appended herewith as Appendix A. While each processor is essentially autonomous, a subordinate hierarchy does, however, exist where, for example, the text processor 50 is dedicated to the user problem execution and the display and memory control processors are subordinated to the requirements of the text processor. This subordination, however, is on the program level only and the lower level operations in the latter two processors are essentially independent.

One additional function performed by the presently described memory control processor is the bus system control. This function is organized around a task priority subsystem described in more detail below. Accordingly each device is further tied to the bus S which in turn is serviced by the task control logic section 200. It is the integration of this section with a logic overlay technique that is presently considered. For this latter reason only the text processor 50, disc 20 and memory control processor 150 need be presented since it is in these devices that entail most memory overlay functions.

This task priority logic 200 section includes a program store (to be described) in which the various system management functions are embedded. This program store may be permanently fixed (ROM) or may include erasable elements (RAM) to allow the system user some flexibility over the system.

The program store is organized in wide instruction sets which are divided into code groups which, according to their code, control the operation of selected elements of the presently described memory control processor. Thus the code of configuration is particular to the architecture described below it being understood that variations in the system will entail variations in code.

General System Arrangement

Figures 2, 10:
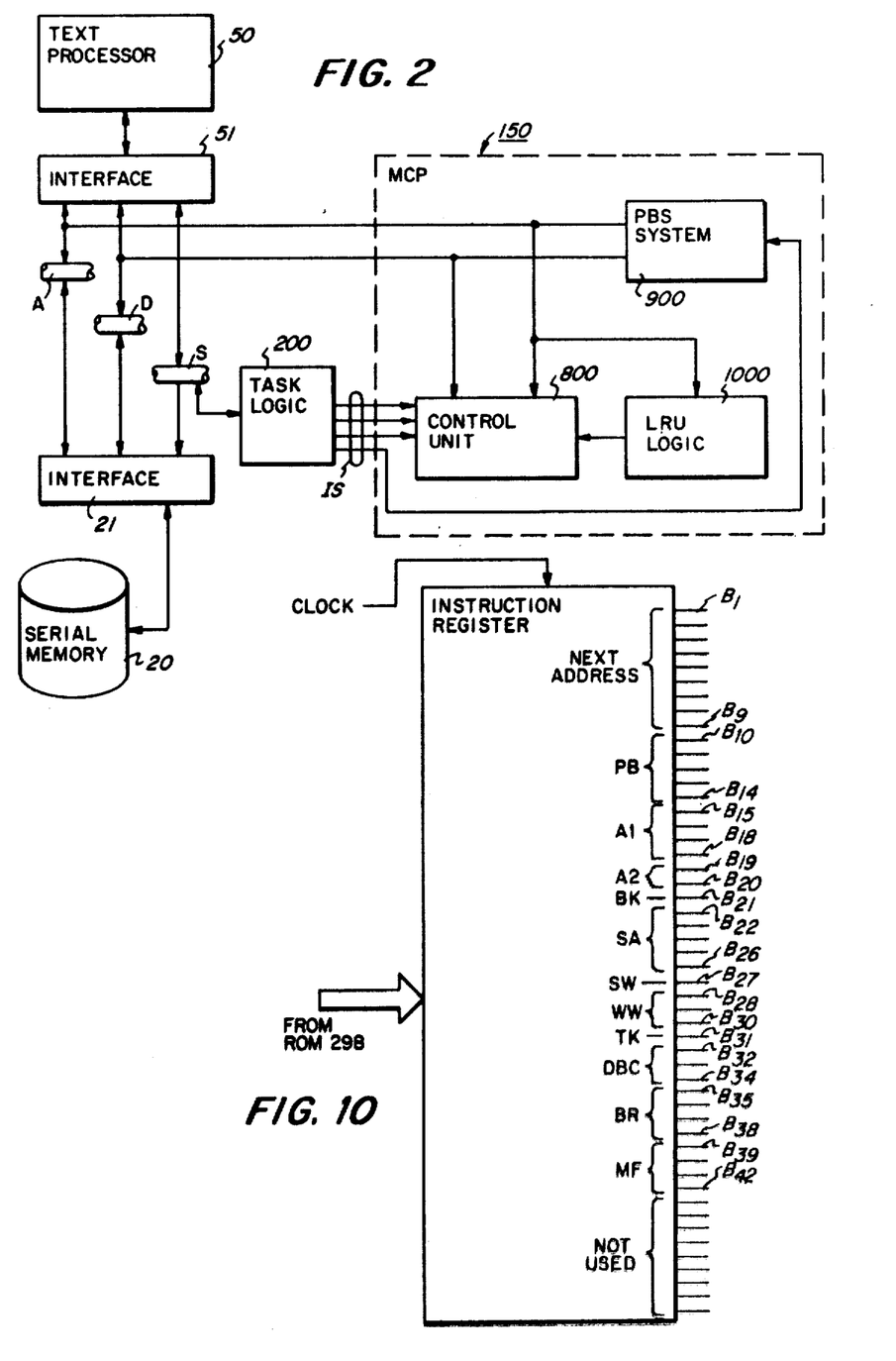
FIG. 2 is a block diagram of selected elements of the system in FIG. 1 which cooperate with the presently set forth memory control processor.
FIG. 10 is a diagram of pin assignments illustrating the code breakdown in an instruction register useful herein.

Shown in FIG. 2, is an exemplary memory control system made up of three basic elements, it being understood that the operation herein is fully expandable to the system shown in FIG. 1. In FIG. 2 the text processor 50 and disc 20 both connect to buses A, D, and S across the corresponding interface stages 21 and 51. Bus S connects to the task control logic 200 which at its output produces a parallel instruction signal IS to the memory control processor 150. Concurrently buses A and D are also applied to that same processor 150. Within processor 150 the signal IS sets the mode of operation of a controller unit 800 with a subset of signal IS furthermore applying the control inputs to a page buffer store system 900. This last signal subset selects the mode of operation of the page buffer store 900. As an example, in most usual instances the address input to the page buffer system 900 is a virtual or disc referenced address input. Thus in most instances a mapped memory read or write operation takes place. In some instances, however, a direct memory access may be desired which again is conditioned by the state of the IS signal. Thus the control input to the page buffer system 900 is in parallel with the input to the control unit 800 and between these two the appropriate bus selections are made.

Concurrently the requested page address is applied to a least recently used logic unit 1000 which provides the linking function to establish the rank ordering of the pages in the page buffer store system.

Memory Control Processor

Figure 3:
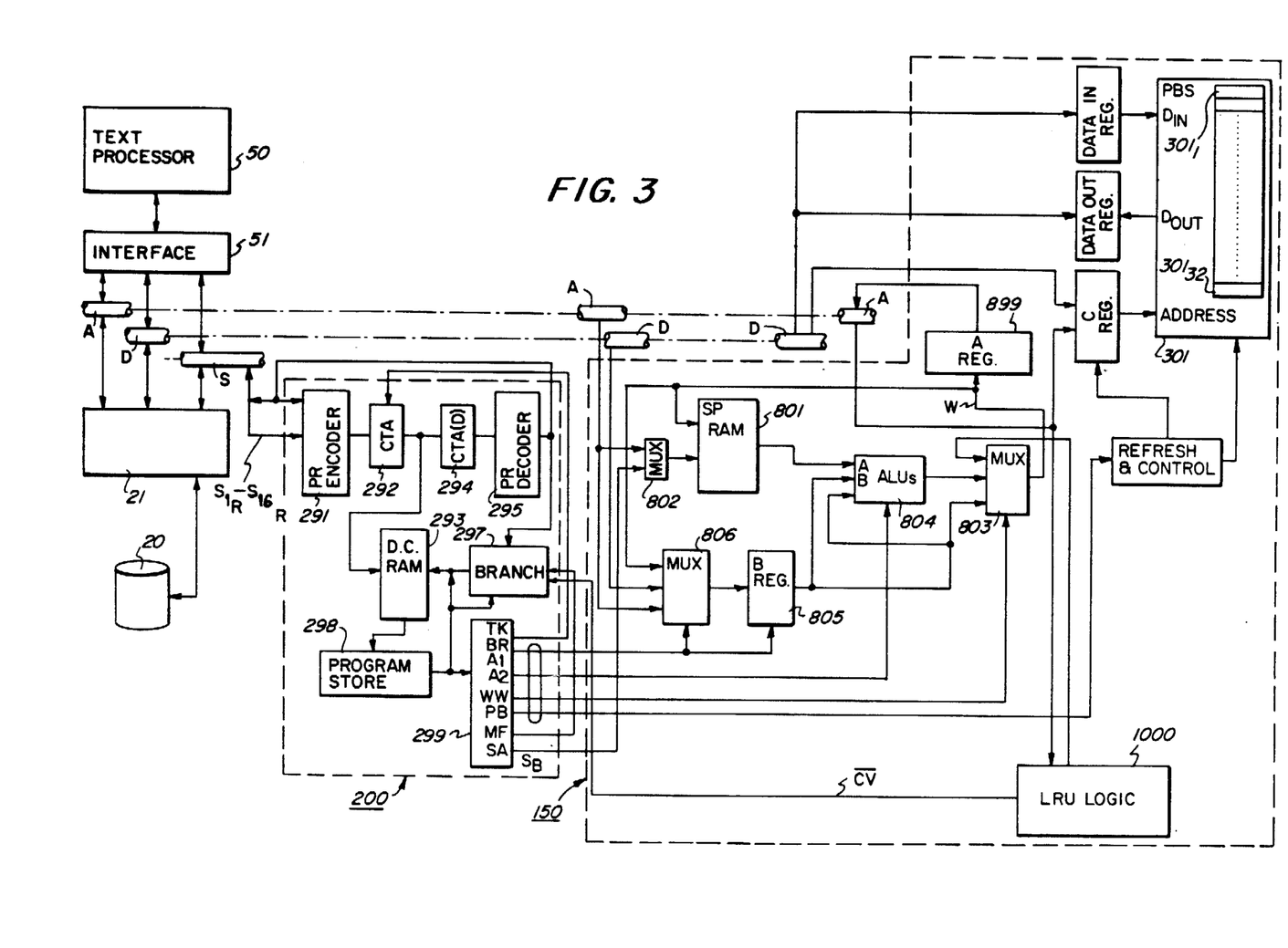
FIG. 3 is a logic diagram of the control segment of the memory control processor disclosed herein.

With the foregoing general description the organization of the Memory Control Processor 150 will now be taken up. To provide the desired autonomous function the memory control processor 150 is organized to respond to requests for memory service from several autonomous system components which may often conflict. These requests are therefore arranged according to system priority each request being served by a microprogram task ranging from a few to several hundred micro-instructions. To accommodate competing tasks within the time interval of a long task execution break points in the microsequences are utilized. Thus several tasks may be multiplexed concurrently according to the following hardware implementation by a deference scheme where a serviced higher priority task is periodically interrupted to allow for concurrent servicing of a lower priority task waiting for service. Specifically as shown in FIG. 3 the task priority logic unit 200 comprises an encoder stage 291 which receives the signal leads from the bus S, each identifying a particular interrupt or task request, and converts such to a fixed priority code which is applied to a register stage 292. Register stage 292 thus provides the selected current task address which is applied to a program counter memory stage (RAM) 293 and to a delayed register stage 294. Register 294 therefore indicates the currently active task and is decoded by a decoder stage 295 which both recirculates its output to the input of stage 291, providing acknowledging signals, and controls a branch stage 297. Branch stage 297 alters the next address input to RAM 293 thus expanding the logic operations in the processor 150. Accordingly register 292 provides the first address to the program counter RAM 293. RAM 293 then stores and outputs the addresses of the task servicing microsequence stored in a microprogram store 298. As each instruction stored in ROM 298 is accessed it is applied to an output register 299 for execution. In the event of a breakpoint the last execution address of the task sequence will therefore reside in a field selected by an address corresponding to that task number.

In order to accommodate a broad range of operations in minimal sequence lengths both the microprogram store 298 and the instruction register 299 are substantially wider than any of the system buses. In this instance a 48-bit wide instruction set is utilized in the ROM 298 and register 299. Nine of these bits are utilized as a next address return to the program counter (PC) RAM 293 and maintain the sequence order while 38 of the remaining bits select the operational mode of the controller 800 and the page buffer system 900. In addition one bit, identified as bit TK, is returned to the current task register 292 and, if high, this register is allowed to select and receive the present highest task request. This, in effect, provides for a programmed breakpoint in each task servicing routine allowing for periodic inspection of the other volatile elements of the system. Since this is a programmed breakpoint the other 38 bits can concurrently direct the appropriate temporary storage of the interrupted sequence which can be subsequently resumed. In this manner an interrupt on interrupt is achieved by which by virtue of the feedback from decoder 295 to encoder 291 excludes the interrupted task from competing with other requests present. To further insure short task sequences both the bit width of the instruction set is wide and the architecture of the controller 800 is also wide. When a task sequence is completed a signal BK (one bit) indicates such.

The foregoing description sets forth an improvement to the task system disclosed in aforenoted application Ser. No. 518,679. This improvement, achieved by the feedback between decoder 295 and encoder 291, precludes a high priority task from monopolizing the memory control processor. More specifically, by virtue of the above feedback connection the higher priority task at its breakpoint (bit TK) will be excluded from the next priority comparison. A lower priority task can then be partly serviced until it reaches a breakpoint (TK). Thus many tasks can be multiplexed for concurrent service with the highest priority task acquiring service every second breakpoint cycle.

Figure 4:
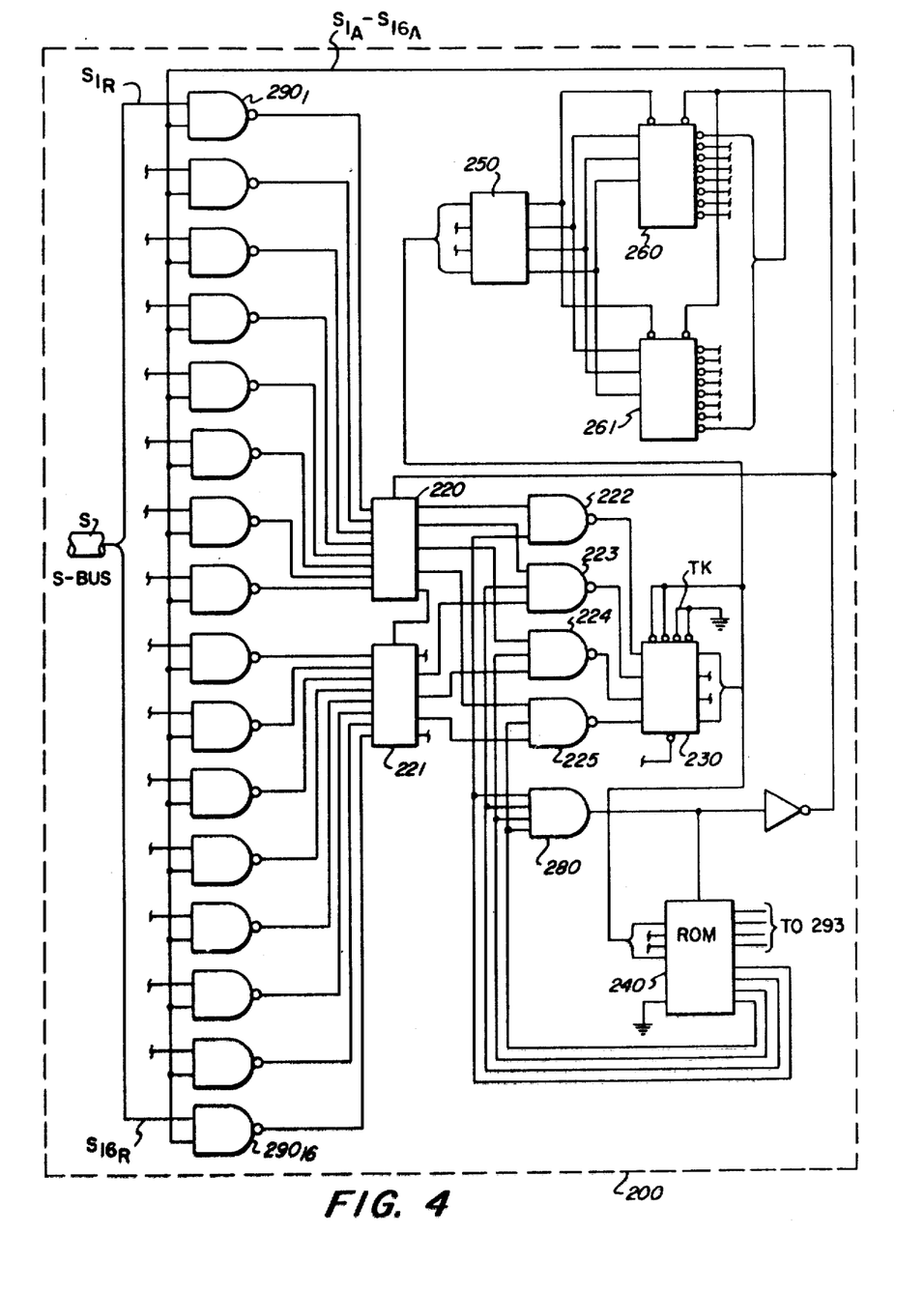
FIG. 4 is a detailed implementation of a tasking system forming a part of FIG. 3.

The implementation of this priority logic is shown in detail in FIG. 4. As shown in this figure, the logic section 200 receives sixteen task request lines $S_{1_R}$ - $S_{16_R}$ which comprise a part of the bus S. It is to be noted that the designation bus S is more fanciful than descriptive since the various signal leads therein are essentially asynchronous, signal leads $S_{1_R}$ - $S_{16_R}$ being raised by autonomous peripherals. Thus, the function of the bus S is not classical, the designation being used merely to identify a group of signal leads serving a similar object.

As stated above, leads $S_{1_R}$ - $S_{16_R}$ respectively, are applied in parallel to one corresponding input of the plurality of NAND gates $290_1$ - $290_{16}$, gates $290_1$ - $290_8$ being collected at the input of a first 8-line-to-3-line priority encoder 220 while gates $290_9$ - $290_{16}$ are collected at the input of yet another similar encoder 221. Encoders 220 and 221 can be conventional devices such as the SN74148 device sold by Texas Instruments, two such encoders being connected in cascade to expand into a 16-line-to-4-line configuration. Encoders 220 and 221 connect their outputs to four NAND gates 222-225, in conventional four bit binary expansion, completing the function of stage 291. Gates 222-225, in turn, connect in parallel to the inputs of the register stage 292 comprising a four bit D-register 230 (such as the Texas Instrument SN74173).

Concurrently the outputs of register 230 are connected to the input of a programmable ROM 240 which forms an initialization stage and which is programmed to initialize the program counter RAM 293. The code in ROM 240 maintains a correspondence with the starting address, and each task will therefore start at an address corresponding to its number. The outputs of ROM 245 are furthermore returned to the inputs of gates 222-225. Register 230 also drives, through a quad flip-flop circuit 250, forming the second register stage 294, two cascaded decoders 260 and 261 (e.g., model no. 3205 by the Intel Corporation) which comprise the decoder 295. Decoder 295 then returns the above described 16 leads back to the gates $290_1$ - $290_{16}$.

Thus, the current task address appears at the output of register 230. The ROM 240 will then provide the first position for any servicing sequence. As these microinstructions are carried through the microprogram store 298 and executed in the processor 150, periodic breakpoints are provided, as a signal TK which enables the selection of the next higher task request.

By way of this circuit arrangement, logic section 200 picks out from several conflicting service requests on bus S a task which demands the quickest attention. While there are many logically correct priority sequences, the configuration of a system in each instance dictates a particular task hierarchy. Accordingly, by reference back to FIG. 1, task request leads $S_{14_R}$ and $S_{15_R}$, two of the higher priority tasks, are assigned to service the memory control processor 150 and are therefore shown as such. Task leads $S_{9_R}$ and $S_{11_R}$, for example, are assigned to memory expansion and therefore interface with the main store or disc 20.

In each of the above instances, two task control leads service the same device. This is necessary because these particular devices entail more than one mode of operation and therefore more than one servicing sequence. Thus, the memory control processor 150, when addressed as a system memory, can perform either a memory read task ($S_{15_R}$) or a memory write task ($S_{14_R}$). Similarly, the use of a disc 20 entails both a disc sector pulse service task ($S_{9_R}$) and a word transfer task ($S_{11_R}$). Since each of these tasks entail essentially distinct service microsequences, they are treated separately. Transfers in and out of the third memory level, i.e., the floppy discs $18_1$, $18_2$, and $18_3$ is at a much slower rate and therefore is both at a lower priority and can be accommodated in a single sequence selected by the task lead $S_{7_R}$. One additional memory service task particular to the architecture of the memory control processor 150, is a memory refresh task on lead $S_{2_R}$ which accommodates volatile accelerator sections of the memory to be directed in more detail below.

Thus task request leads $S_{2_R}$, $S_{7_R}$, $S_{9_R}$, $S_{10_R}$, $S_{14_R}$, and $S_{15_R}$ are all assigned to memory service, removing the demand for the servicing routines necessary in a large memory system from the program load of the text processor 50.

In addition to these memory service tasks, there are tasks particular to input-output service shown by way of lead $S_{13_R}$ connected to the disc file 16.

Thus, the following hierarchy of service routines is established:

$S_{2_R}$ — volatile memory refresh
$S_{7_R}$ — third level memory transfer $S_{9_R}$ — main or secondary store write
$S_{10_R}$ — PBS to or from main Serial Store Transfer
$S_{13_R}$ — 1/0 bus service
$S_{14_R}$ — memory write
$S_{15_R}$ — memory read In addition to these service sequences, there is a sequence which is tied to any fault identification logic. Since signal fault incidence is normally dependent on the physical environment of the system, and is therefore unique with each user, no one fault checking system can be practically presented which accommodates all failures possible. Accordingly, a generalized parity check circuit 25 is included in FIG. 1 tied to buses A and B and to bus S by the status lead $S_{16_R}$. This insures that any faults are assigned the highest priority to permit diagnosis at a point in time closest to the occurrence.

By further reference to FIG. 3 the controller 800 includes a scratch pad RAM 801 which provides the above described function of temporary storage. This scratch pad memory 801 is addressed either from bus A for communication with the text processor or register 299 according to the selection made by a device like a multiplexer 802. The selection of the multiplexer 802 mode is under the control of the same instruction register 299 and particularly by way of a field identified as field MF which also controls the branch stage 297 in its other modes. The selected address, at least in one of the modes, is similarly originated in this instruction register at a 5-bit field identified as field SA. The data input to the scratch pad memory is by way of a processor bus W which originates at the output of yet another multiplexer 803. Multiplexer 803, in turn, selects between the output of the LRU logic stage 1000, the output of an arithmetic logic unit (ALU) 804 or the output of a B-register 805 which, in turn, stores (and sometimes shifts) the selected output of a multiplexer 806, the D or the A bus. Both the shifting of register 805 and the selection mode of multiplexer 806 are again under the control of the instruction register 299 and particularly under the control of a 4-bit field thereof designated BR. The inputs of multiplexer 806 are the A, D and W buses. By virtue of this configuration register 805 may, by shifting, strip out the word number bits on the bus A. Thus the full 16 bit address space may be utilized to select pages, expanding the total address space. An additional input to multiplexer 806 and register 805 in the field BR allows for a right-six-bit shift to strip out the word number. In this manner only page numbers are treated by controller 800, expanding further the address space in the main memory.

Similarly, the A and B inputs to ALU 804 are respectively the output of memory 801 and the B-register 805 with the logic mode selected by fields $A_1$ and $A_2$ in the instruction register. The mode selection of multiplexer 803 is set by a field WW again in the instruction register 299. The contents of bus W are also periodically applied to a register 899 to be impressed onto bus A.

Thus, RAM 293 provides the function of a program counter for the various task sequences which in parallel changes the operating modes of the control unit 800. During the execution of any one servicing sequence, it is possible to program for branch tests which are then carried out in the branch stage 297, thus allowing the programmer flexibility over the servicing microprograms.

The arrangement of the page buffer system has been set forth, in part, in FIG. 4 of the appended application. Parts of this same FIG. 4 are now illustrated as block 900 in FIG. 3.

As shown in block 900 a random access page buffer store 301 is now shown to include, for example, the storage capacity of 32 "pages" of memory shown as page fields $301_1$ - $301_{32}$, each such page corresponding to a sector space in the disc 20. Disc 20 is a conventional, stationary head, disc to which access is made by the address on bus A. In detail, leads A0–A9 identify the disc page, the first or the most significant five bits identifying the track number while the second five bits identify the sector. The remaining seven bits or bits A10–A17 identify the particular word within the page of memory, and are therefore more pertinent to the page buffer store 301. It is only the ten most significant bit leads of bus A that are involved in any page swapping logic or page link and overlay performed in the least recently used logic stage 1000. In addition a refresh cycle is developed in a refresh and control stage 399 in response to selected instructions in register 299. This allows the use of a volatile memory for the buffer store 301.

Further elements included in the page buffer system 900 have been described in Appendix A and reference should be made thereto for operational details.

Least Recently Used Logic

To avoid encumbering the execution of the main program (in the text processor 50, for example) with inordinate delays of reordering a rank-order file of the page buffer system 900 a simple and short technique is necessary. Commercial processors, like the IMP 16C, for example, use either a 4, 8 or 16-bit system bus and furthermore execute at a relatively low rate. Since most users will be primarily familiar with such a commercial processor any updating of a ranking system for memory overlay should execute within an execute cycle of the text processor 50. Most typically it is the memory access (Read or Write) that is invoked. During normal operations most memory access will be to the pages stored in the page buffer system 900 which are the pages monitored by the LRU system 1000. For example, in word processing applications the function of editing is most frequently utilized. In this mode the user is working within a predetermined text section which can be stored within the 32 pages of memory in the page buffer system. As the user progresses down the text certain areas or fields of memory will be addressed with less and less frequency. Rather than encumbering the user with the burden of maintenance of the accelerator memory, this feature of decreasing use is automatically utilized for memory overlay. This feature, however, can only be utilized if some record of the access history is maintained. Heretofore this record has been maintained with relatively cumbersome ranking systems.

The present Least Recently Used Logic (LRU) 1000 is structured for at least a gross switching rate compatibility with the remaining parts of the system. To accommodate this objective the interfacing control unit 800 is structured as a wide system to limit the number of execution steps in any overlay routine.

Figure 5:
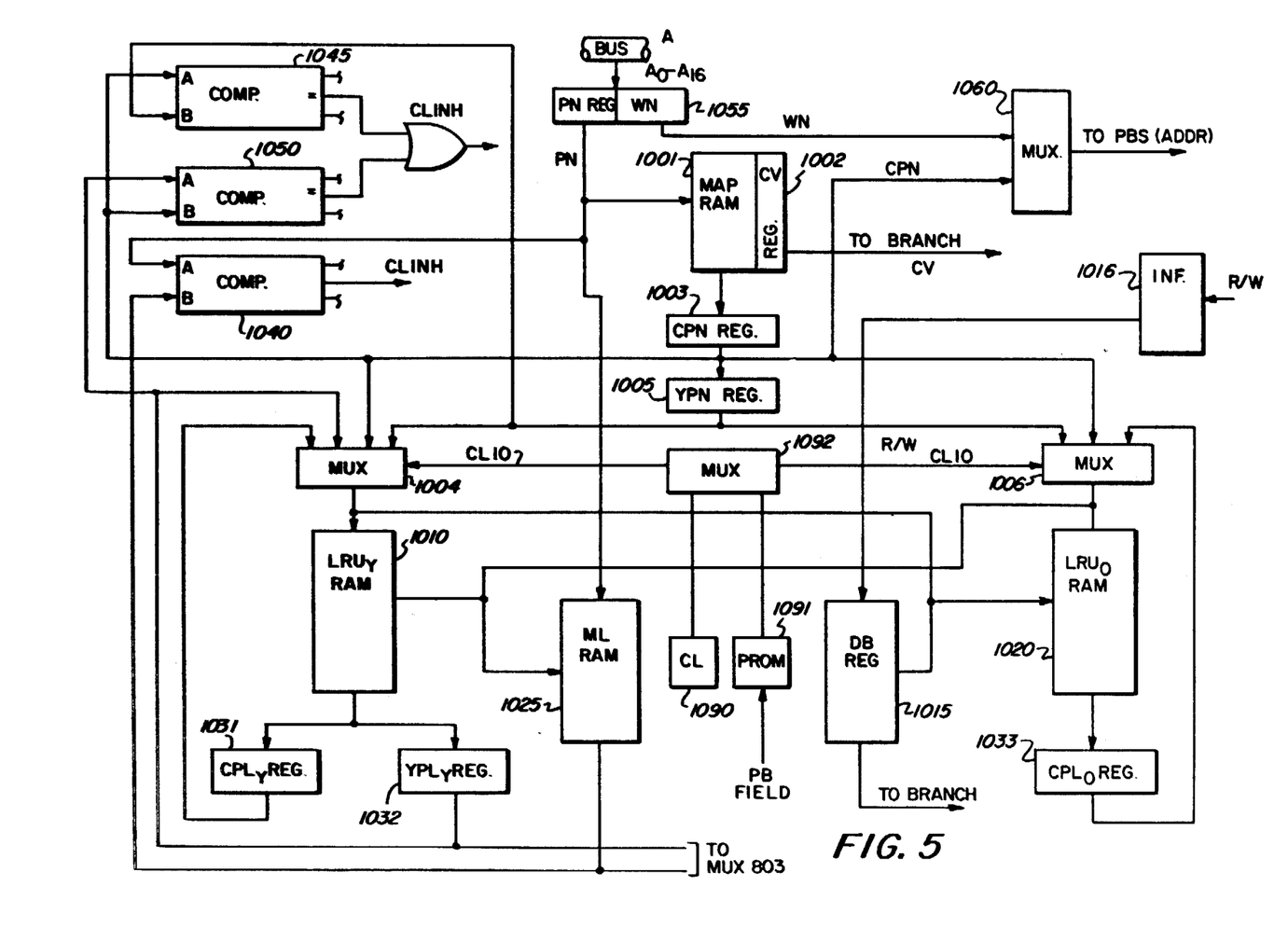
FIG. 5 is a logic diagram of an overlay stage adapted to monitor the access history to an accelerator store incorporated herein.

BY specific reference to FIG. 5 the organization of the Least Recently Used Logic 1000 will now be taken up. It is to be noted that the architecture and operation disclosed below is primarily adapted to match a typical page buffer memory access cycle of a using device (e.g. processor 50). Any update or overlay that may be necessitated by some of these requests will entail a much slower access time, primarily as result of the relatively slow rate of disc 20 or any other serial memory. The following description will therefore consider a rank ordering scheme which occurs on each memory request, and which therefore is dominantly directed to the page buffer system 900.

Thus, as a requested memory address is entered onto bus A address leads A0-A9 are then applied to mapping RAM 1001 which converts the disc 20 referenced address into a corresponding page buffer address. If that page of data is stored in the page buffer system 900 a two bit wide link register 1002 connected to the map RAM 1001 isues a Contents Valid signal CV to the branch unit 297 shown in FIG. 3. When a page is not in the page buffer system 900 signal CV goes high to initiate an overlay from the main memory.

In the former instance, i.e., when the accessed page is stored in the page buffer system 900, the corresponding page buffer address also included in RAM 1001 is strobed into a Current Page Number (CPN) register 1003. The output of register 1003 is applied to a multiplexer 1004, a Younger Page Number (YPN) register 1005 and yet another multiplexer 1006. Multiplexers 1004 and 1006 also receive the output of the YPN register 1005. Multiplexers 1004 and 1006 operate in straight multiplexing fashion, according to a clock signal $CL_{10}$ which is utilized to synchronize the whole Least Recently Used (LRU) logic stage 1000. This clock rate is developed by a clock 1000 in combination with the outputs of a ROM 1091 selected by the PB field in register 299. These two signals are then combined in a multiplexer 1092 forming the clock signal $CL_{10}$.

The output of multiplexer 1004 is applied as an input to a Least Recently Used to Younger ($LRU_Y$) RAM 1010, to be stored therein at an address location selected by the multiplexer 1006. Similarly the output of multiplexer 1006 provides an input to an LRU to older ($LRU_O$) RAM 1020 at an address set by multiplexer 1004. Thus, by cross-connecting two multiplexers 1004 and 1006 a linking sequence in two directions is conveniently established.

While the above brief outline of the link reordering sequence utilized herein is adequate, additional functions can be concurrently implemented. One exemplary function is that required for "dirty page" recognition. Any time a memory write operation takes place (into the page buffer system) it is an a priori condition that the new data be transferred back onto the disc 20 before a memory overlay sequence is activated. This avoids the possibility of overwriting a newly written or edited memory page and thus destroying newly generated data. For this purpose the output lines from multiplexer 1004 are routed through a 1 bit wide register or RAM 1015, identified herein as a Dirty Bit (DB) RAM, which concurrently is loaded with a R/W (Read/Write) signal originating again in PROM 298. Thus as a new link order is generated RAM 1015 concurrently stores information as to whether the most recently used page now includes new data. This information is then brought out as a second signal input, or a "dirty page" signal, to the branch stage 297 which modifies the overlay sequence once that page migrates down to become the least recently used page.

Similarly the multiplexer 1006 output is concurrently applied to a Map Linking (ML) RAM 1025 which is concurrently loaded with the leads $A_0$-$A_9$ from bus A. The ML RAM 1025 then provides the above-mentioned signal input to multiplexer 803 linking back the page buffer system referenced addresses to the real or disc referenced address.

Both the above functions assist in the overall integration of the system. In addition thereto a third collateral feature, described in application Ser. No. 769,593, filed Feb. 17, 1977, and entitled "Interrupt Request Controller For Data Processing System", is included in the arrangement of the mapping RAM 1001. It is the purpose of this function to organize memory pages into logical page sequences and therefore control the overlay sequence to overlays into page sets rather than pages. For the present, however, it is sufficient to assume that overlay can occur on a single page, it being understood that the term "page" may include more than one designated field of accelerator memory.

Referring back to the main LRU logic arrangement RAM's 1010 and 1020 comprise a doubly linked circular list. This approach maintains the link order with sufficient speed to match the memory service request speed of the text processor 50. Connected to the output of RAM 1010 is a Current Page Link to next Youngest $CPL_Y$) register 1031 and a Youngest Page Link to next Youngest ($YPL_Y$) register 1032. The outputs of registers 1031 and 1032 are returned to multiplexer 1004 to complete the circulation. Similarly RAM 1020 is tied at its output to a Current Page Link to next Oldest ($CPL_O$) register 1033 which, again, is returned to multiplexer 1006.

In addition to the link system described, the LRU stage 1000 includes a comparator 1040 connected to receive bits $A_0$-$A_9$ from bus A at one input thereof and the output of RAM 1025 at the other input. Comparator 1040 indicates a fault, and therefore immediately inhibits the clock signal $CL_{10}$ when bits $A_0$-$A_9$ are not equal to the ML output of RAM 1025. Two additional comparators 1045 and 1050, respectively, compare the contents of registers 1003 and 1005, and 1003 and 1032 to inhibit, again, the clock signal $CL_{10}$ whenever CPN = YPN or CPN = $YPL_Y$. These last two comparators simply determine whether any link update is necessary since in many instances repetitive requests may be directed at the same memory page and therefore no new ordering of use history is required.

In addition to these basic functions there are further elements in the LRU stage 1000 which, in essence, refine the operation and are presented herein for completeness. For example, while reference has been made to the bus A as the direct source of address, in real applications a register 1055 is used between bus A and the LRU system. Register 1055 is as wide as bus A, splitting the address into the word number (WN) bits and the page number (PN) bits at its output. Bits PN correspond to the above referenced bus leads $A_0$-$A_9$ and are therefore the signal input previously discussed. Bits WN correspond to the word number address, i.e., bus A leads $A_{10}$-$A_{16}$ and are therefore trivial to the LRU system. Once a page has been found present in the MAP RAM 1001 the address to the page buffer store system appears at the output of the CPN register 1003. This page buffer referenced address is then recombined with the WN bits in a multiplexer 1060 to form the address input to the page buffer system 900. This multiplexing feature, however, is only required because of the selection of a 4K-16 pin RAM herein.

According to this implementation, multiplexer 1004 cycles across four inputs; multiplexer 1006 has only three and the fourth can therefore be used to initialize the system. The normal update, however, requires only four clock increments or cycles once the determination is made that the requested page is in the page buffer store.

Normal LRU Cycle

Figure 6:
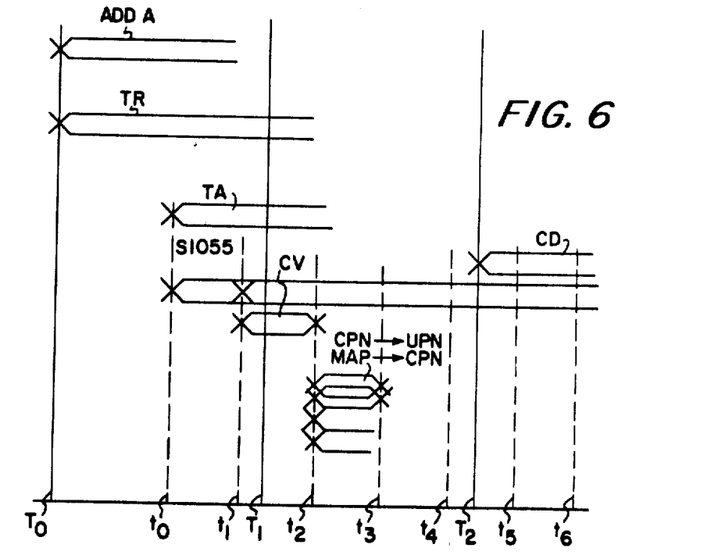
FIG. 6 is a timing diagram of selected signals developed at various points in FIGS. 3 and 5.

In most instances the memory service requests for tasks are accommodated within the page buffer system 900. Thus it is only necessary to accommodate the LRU update within a memory read or a memory write cycle. This comparison of cycles is set forth in FIG. 6. As is shown in this figure the text processor 50 requires three cycles to execute a memory read or memory write instruction. These are as follows:

Address to Bus A, ADDA;
Task Request TR (in parallel);
Task Acknowledge Cycle TA; and
Data Cycle DC.

These are shown to occur at times $T_0$, $T_1$, and $T_2$, i.e., at the text processor 50 clock rate. The task acknowledge signal TA, however, originates asynchronously within the $T_0$ cycle at a time $t_0$, at the first leading edge of the MCP clock signal $CL_{10}$. That same signal strobes the contents of bus A into register 1055 which provides the signal CV. If CV is true the next clock cycle $T_2$ loads the CPN register 1003 with the present page. Also the YPN register 1005 inputs into the multiplexers 1004 and 1006 together with RAM 1010 strobing data into register 1033. On the next cycle $T_3$ the CPN register 1003 is selected by multiplexers 1004 and 1006 and the corresponding fields in RAM's 1010 and 1020 are stored in registers 1031 and 1033. If the comparators 1040, 1045 and 1050 still hold, the four remaining cycles ($T_3$-$T_6$) finish out the circulation. Finally at time $T_6$ the CPN register is unloaded into the YPN register to set up for a new sequence. Thus within three cycles of the text processor 50, six cycles of link sequence are required. The clock disparity is therefore quite low and any chip switching speed is within the time domain of the text processor. The multiplexer in the LRU system operates on a different clock rate and therefore completes within 4 cycles of the Memory Control Processor.

Figure 7:
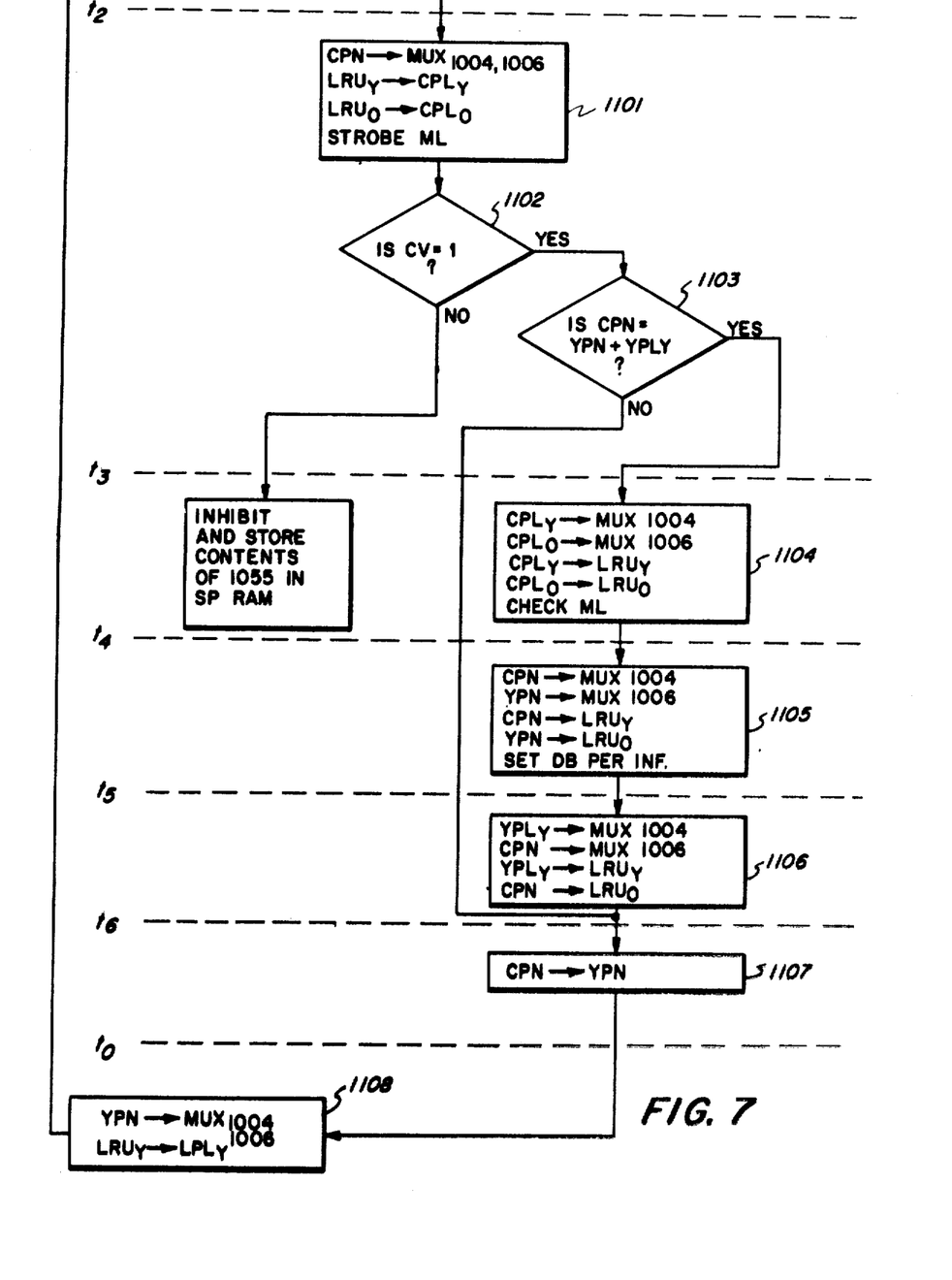
FIG. 7 is a flow chart of steps executed within the logic devices of FIGS. 3 and 5.

By reference to FIG. 7 this same microsequence is set forth as a flow chart wherein all parallel events are listed in a common step. Furthermore to consolidate this flow chart with the description of FIG. 5 the mnemonics used to describe the various system elements are continued herein. The sequence starts with step 1101 wherein both multiplexers (MUX) 1004 and 1006 are receiving the current page number from the CPN register 1003. Within the same clock period ($T_2$-$T_3$) the CV bit is inspected in step 1102. If the current page is in the page buffer system 900 (CV = 1), then the next check is to see if a link update is necessary i.e., is the same page addressed again. This is verified in step 1103 according to the status of comparators 1045 and 1050. It is to be noted that steps 1102 and 1103 are carried out in parallel with step 1101 and thus occur in the same clock cycle.

If an update is to occur (per step 1103) then step 1104 is taken up on the next clock cycle ($t_4$). In this step the $CPL_Y$ and $CPL_O$ registers 1031 and 1033 are circulated through the corresponding multiplexers 1004 and 1006 into the $LRU_Y$ and $LRU_O$ RAM's 1010 and 1020 and the ML RAM is strobed to load in the corresponding bus A address (virtual back to real).

At the next clock cycles $T_4$ and $T_5$ set the links the other way as shown in steps 1105 and 1106. Concurrently, in step 1105 the DB register 1015 is set according to the INF register 1016 indicating any insertion of new data into that page.

Finally in step 1107 at time $T_6$ the CPN register 1003 is transferred into the YPN register 1005 to prepare for the next sequence and $YPL_Y$ register 1032 is loaded (in step 1108). This can occur in the $T_6$ - $T_0$ interval, overlapping the task decode cycle occurring in unit 200.

Operation

The integration of the controller 800, page buffer system 900 and the least recently used system 1000 is best described in the process of execution of a memory service request from the text processor 50. As described in the referenced and appended application Ser. No. 769,594, entitled "Soft Display Word Processing System" the text processor 50, during its operation periodically makes access to the page buffer system 900 to either read or write data. This is accomplished by invoking or raising a corresponding task line in the bus S. This raising of task requests is operating at the clock transitions of the text processor 50 which is common with the system clock. The memory control processor 150, however, is asynchronous with respect to the disc 20. In fact the disc 20 is operating at a grossly disparate rate relative the other clocks in the system.

Figure 8:
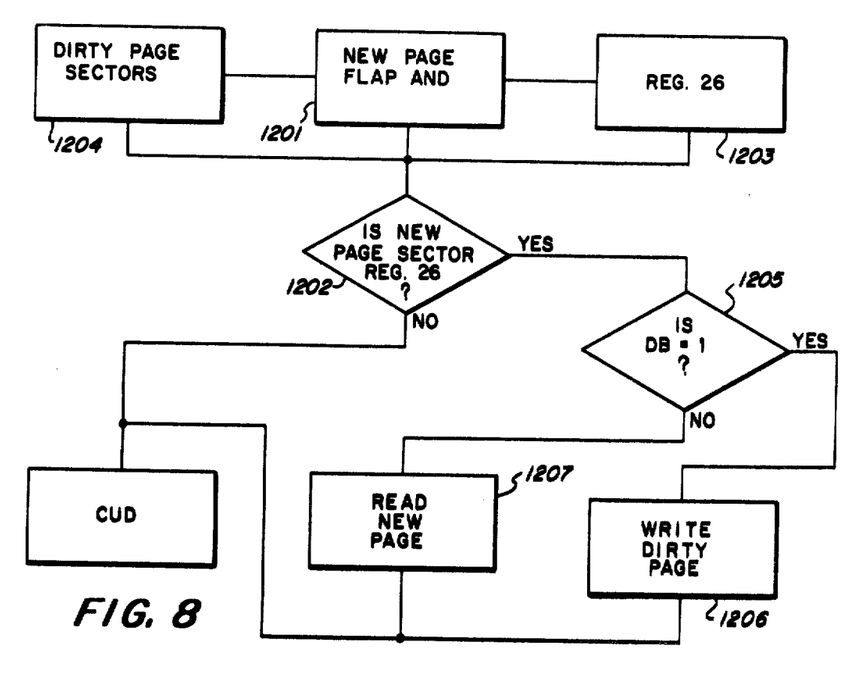
FIG. 8 is a detailed flow chart of an exemplary sequence operative herein.

By way of this arrangement an operational sequence shown in FIG. 8 is established. As illustrated by way of a flow chart in this figure the first step 1201 determines whether a new page is requested (a flag is set) and what the sector is of that new page. In step 1203, which can occur simultaneously, the DB register is loaded. The data generated in steps 1201 and 1203 is then tested in step 1202 to see if the disc 20 is arriving to the new page position in the next sector pulse. Concurrently in step 1204 the "dirty page" input is entered. If there is a "dirty page" as tested in step 1205 then step 1206 to write the modified page into disc is invoked. If not then a "new page" read step 1207 is invoked. Steps 1206, 1207 and the "no" branch in step 1202 all terminate in an "end" step, terminating this function.

The foregoing flow chart in FIG. 8 is generally also descriptive of the steps taken by the microprogrammed sequence set forth in the Appendix.

It is to be noted that the foregoing sequence is implemented in conjunction with the microcode stored in store 298. To illustrate this implementation the full breakdown of the code is shown in FIG. 10 which is accompanied by the following code summary.

More specifically the instruction register 299 is shown in its bit detail in the form of a 48 bit wide register. In this context it is to be understood that a 48 bit register may comprise a set of parallel registers of standard bit width and the single unit implementation is therefore symbolic only. For purposes of clarity the bits of register 299 are labeled as $B_1$ - $B_{48}$, bit leads $B_1$ - $B_9$ being returned to the PC RAM 293 as set forth above. Bits $B_{10}$ - $B_{14}$ are identified as a PB field which controls the operation of the page buffer control or decoder 311. This five bit field thus controls the transfer of bus A as the page buffer store 301 address input, (entailing first a signal CV response), a direct memory access, a loading operation of the C-register 310 with the contents of bus D, as well as the transfer of the LRU system 1000 outputs onto bus W for any overlay routine.

Bits $B_{15}$ - $B_{18}$ contain the A1 code which accommodates the operations in the ALU 804 for its various functions. More specifically this bit field controls the various propagation paths through ALU 804, such as the transfer of the content of the B register 805 into multiplexer 803, the transfer of the contents of the scratchpad memory 801 into multiplexer 803, input of all logical ones from ALU 804 to multiplexer 803, and input of all logical zeros in the same connection. Various logical and/or an inversion are accommodated by the same field.

In addition, the field designated as field A2 and comprising two bits $B_{19}$ and $B_{20}$ also controls the operation of the ALU 804 to provide various arithmetic operations therein.

At bit position $B_{21}$ a one bit field identified as the BK field allows the resetting of a task activation request for the currently running task.

Bits $B_{22}$ - $B_{26}$ contain a five bit field which sets the address in the scratchpad memory 801. Accompanying this bit field is a one bit field identified as field SW on bit lead $B_{27}$ which enables writing into the scratchpad memory 801.

Multiplexer 803 is controlled by the aforementioned 3 bit field WW located on bit positions $B_{28}$ - $B_{30}$. This bit field controls the selection of the inputs in this multiplexer. For the purposes herein an 8 input multiplexer is utilized herein collecting the output of ALU 804, the LRU logic 1000 outputs, and the output of the B register 805.

The aforementioned TK signal is shown originating at bit $B_{31}$ and when high allows the loading of the current task register 292 with the next task request.

In addition to these fields, there are certain bus control fields shown herein as a DB field on bit leads $B_{32}$ - $B_{34}$. The signals on this last bit field operate in conjunction with the controller signals to identify whether the A bus carries a device address, direct the bus D to a particular peripheral and indicate where the D bus is presently carrying data.

The B register 805 and its multiplexer are controlled by a four bit field on bit leads $B_{35}$ - $B_{38}$ and identified herein as bit field BR. It is to be noted that this last bit field splits up two bit inputs to each of the foregoing devices. Thus the multiplexer 806 is controlled to select between the address on bus A, the data on bus W and the data on bus D. In addition the B register can shift in both right and left directions and is controlled in such shifts by the same BR field.

The next three bit positions, i.e., bit positions $B_{39}$ - $B_{41}$ contain a three bit field identified as the AR field used to control the operation of the A register.

In addition there is a four bit field identified as the MF field controlling in one mode the operation of the branch logic 297 and in the other mode providing various miscellaneous functions not accommodated herein above. In the branch mode the most significant bit of this field was selected by the most significant bit in this bit field, the least significant bit of the nine leads return back to the PC RAM 293 is modified in conjunction with signals appearing in the rest of the system. This modification of the least significant field allows for branching dependent on any one of up to sixteen branch conditions. For this reason branch logic 297 include several one out of eight multiplexers which are set according to the code appearing on the MF field.

By way of these signals a wide set of options is implemented through the various multiplexers. Thus a broad range of operations can run concurrently through the memory control processor with the PC RAM and the scratchpad memory maintaining continuity. This breadth allows for completion of most routine tasks while the text processor is still in the same execution cycle.

It is to be noted that the same arrangement of parts may be utilized to advantage with a CCD memory substituted for the micro-RAD 20. To illustrate the execution routine associated with a CCD reference should be had to FIG. 11. This figure sets forth a flow chart in a convention known to those skilled in the art. Accordingly only limited references will be made to selected steps therein, it being understood that the other steps are to be executed in a manner conventional in the art.

Figure 9:
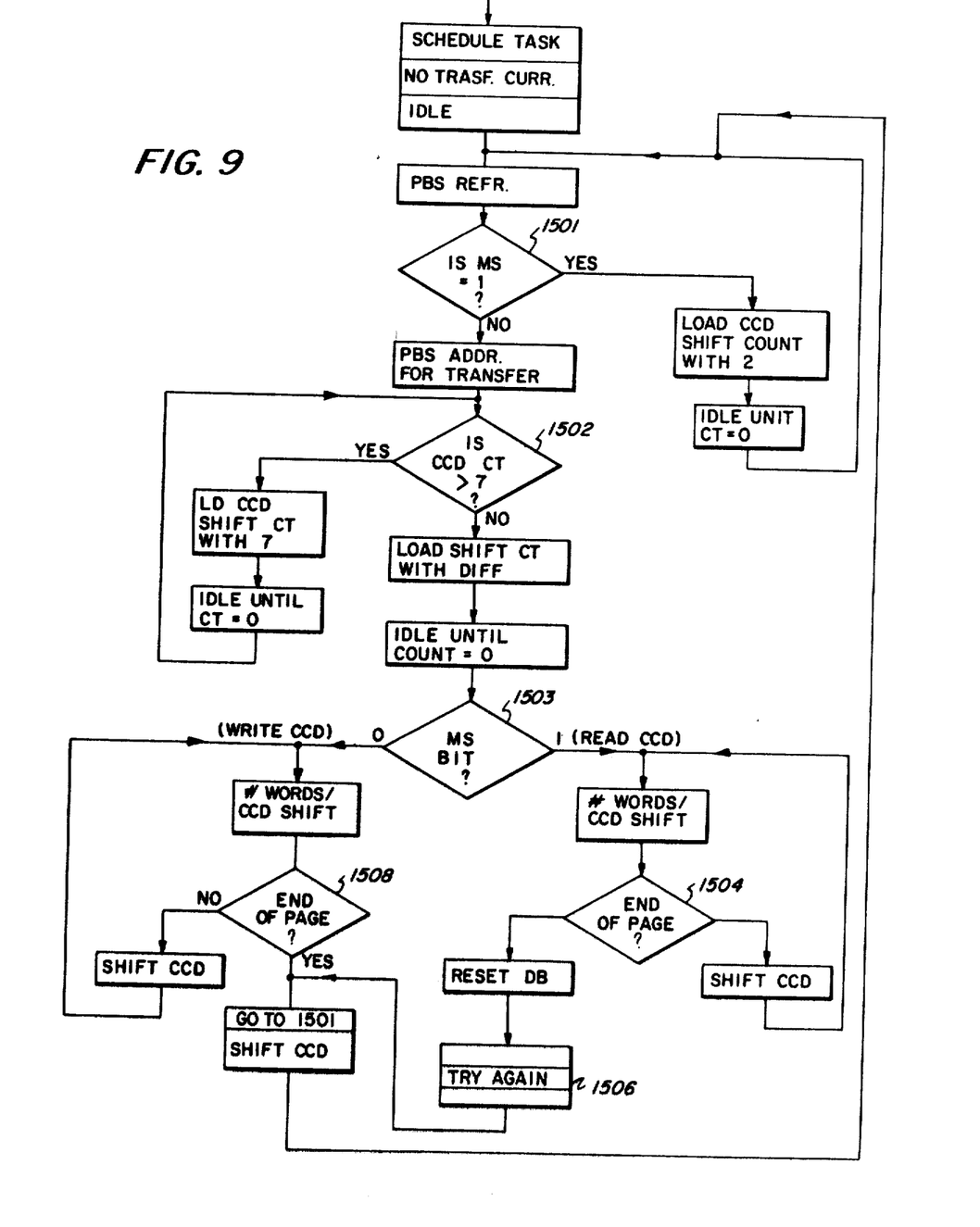
FIG. 9 is yet another flow chart useful in illustrating the operative steps executed in FIG. 8.

Thus by reference to FIG. 9 step 1501 checks the status of the MS bit. If MS=0 then the next decision is whether the CCD shift count is less or greater than 7. This is done in step 1502. The next step 1503 once more tests the MS bit to determine if it is a read or a write. On the read side the shifting of the CCD memory continues until end of page tested in step 1504. If end of page is satisfied then the dirty page bit DB is unlocked in step 1505 and a TRYAGAIN is broadcast to the bus system in step 1506. On the write side only an end of page test is made in step 1508. Steps 1506 or 1508 return the loop back to start or the top of step 1501.

Thus a convenient technique of integrating bus and memory control has been achieved which, furthermore, automatically maintains an overlay algorithm, all within a single cycle of the text processor. This technique furthermore is compatible with various memory devices.

Obviously many modifications and variations to the above disclosure can be made without departing from the spirit of the invention. It is therefore intended that the scope of the invention be determined solely on the claims appended hereto.

We claim:

1. In a data processing system including a main processor conformed to execute instructions selected by a user, a plurality of input and output devices, a memory system comprising at least one main memory having stored thereon data or instructions and an accelerator memory adapted to temporarily store selected portions of said data or intructions, and an external bus system connected to said main processor, input and output devices and said memory system for communicating said data or instructions therebetween, the improvement comprising:
   recording means, connected to said memory system for maintaining a record of link codes identifying the order of relative usage of predetermined segments of said data or instructions concurrently stored in said accelerator memory;
   memory overlay means, connected between said accelerator and main memories and adapted to receive said link codes for selectively overlaying, in response to a code signal, segments of said data or instructions, requested by said processor and not currently in said accelerator memory, into segments thereof having least recent usage; and
   mapping means connected between said external bus system and said recording means for providing said code signal to said overlay means indicative of the presence of said segments in said accelerator memory.

2. Apparatus according to claim 1 wherein:
   said main memory comprises a serial memory; and
   said accelerator memory comprises a random access memory.

3. Apparatus according to claim 2 wherein:
said segments of data or instructions are stored in said memory at uniquely addressable locations identified by corresponding address codes;
said processor communicates said address codes to said bus system; and
said mapping means includes conversion codes connected for selection by said address codes, said conversion codes identifying a corresponding segment of data or instructions in said accelerator memory.

4. A memory control processor adapted for cooperative use with a data processing system for periodically promoting and demoting segments of data or instructions between a main memory and an accelerator memory in operative sequences substantially autonomous of said data processing system, comprising:
controller means including a scratchpad memory, first multiplexing means connected to said data processing system for providing both data and address inputs to said scratch pad memory, arithmetic logic means connected to the data outputs of said scratch pad memory, second multiplexing means connected to apply a second set of signals to said arithmetic logic means, and third multiplexing means connected to receive the output signals from said arithmetic logic means;
interconnecting means for feeding back the output signals from said third multiplexing means to said first multiplexing means, for connecting said third multiplexing means to said data processing system, and for connecting said data processing system and said third multiplexing means to said second multiplexing means;
record means, operatively connected to said accelerator memory, for providing a status code indicative of the presence of selected ones of said segments of data or instructions in said accelerator memory; and
microprogram storing means, connected to said data processing system and to said record means, for producing sequential overlay control signals to said first, second and third multiplexing means, when said status code indicates the absence of a selected segment of data or instructions, to provide a communicating path between said main memory and said accelerator memory.

5. A memory control processor adapted for semi-autonomous use with a data processing system for automatically promoting and demoting data or instruction segments between a main memory and an accelerator memory in response to a data or instruction request signal from said data processing system issued in conjunction with a segment address code referenced to the segment coordinates of said main memory, comprising:
a microinstruction store adapted to store a plurality of multimodal microinstruction sequences;
program counting means, operatively connected to receive said data or instruction request signal from said data processing system, and adapted to receive selected portions of the output signals from said microinstruction store, for selecting the initial microinstruction in response to said request signal and the subsequent microinstructions in said sequence according to said selected portions;
mapping means, connected to said accelerator memory, for storing a transformation code addressable by said address code indicative of the address coordinates of said segments in said accelerator memory, and for storing a presence code indicative of the presence of said segment in said accelerator memory;
branch means, interposed between said microinstruction store and said program counting means, and rendered operative in response to said presence code, for modifying said selected portions to select a corresponding first sequence mode according to the status of said presence code; and
controller means, interposed between said main memory and said accelerator memory, for overlaying segments of data or instructions requested by said processing system from said main memory to said accelerator memory according to said selected sequence.

6. Apparatus according to claim 5 wherein:
said accelerator memory is a random access memory; and
said main memory is a serial memory having stored therein more segments of data or instructions than those stored in said accelerator memory.

7. Apparatus according to claim 6 further comprising:
monitoring means connected to said mapping means and said controller means for maintaining a link sequence indicative of the usage rates of said segments in said accelerator memory and for providing signal indicative of least recently used segments to said controller means directing the overlay sequence in said controller means to said least recently used segments.

8. Apparatus according to claim 7 wherein:
said monitoring means further includes recording means connected between said accelerator means, said controller means and said branch means for producing a new data code indicative of new code entries into said segments in said accelerator memory to said branch means for rendering said branch means operative to select a corresponding second sequence mode according to the status of said new data code.

9. Apparatus according to claim 8 wherein:
said monitoring means is rendered operative within a requesting cycle of said data processing system.

* * * * *